US010812490B2

(12) United States Patent
Sardesai et al.

(10) Patent No.: US 10,812,490 B2
(45) Date of Patent: *Oct. 20, 2020

(54) PERMISSIONS USING BLOCKCHAIN

(71) Applicant: Verizon Patent and Licensing Inc., Arlington, VA (US)

(72) Inventors: Ashish Sardesai, Ashburn, VA (US); Dante J. Pacella, Charles Town, WV (US); Sonit Mahey, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,012

(22) Filed: Jun. 5, 2019

(65) Prior Publication Data

US 2019/0312875 A1 Oct. 10, 2019

Related U.S. Application Data

(63) Continuation of application No. 15/442,235, filed on Feb. 24, 2017, now Pat. No. 10,356,102.

(51) Int. Cl.
*H04L 29/06* (2006.01)
*H04L 9/32* (2006.01)

(52) U.S. Cl.
CPC .......... *H04L 63/101* (2013.01); *H04L 9/3239* (2013.01); *H04L 9/3297* (2013.01); *H04L 2209/38* (2013.01)

(58) Field of Classification Search
CPC .................................................. H04L 63/101
See application file for complete search history.

(56) References Cited

U.S. PATENT DOCUMENTS

| | | | | |
|---|---|---|---|---|
| 10,356,102 B2* | 7/2019 | Sardesai | ............... | H04L 9/3239 |
| 10,447,770 B2* | 10/2019 | Pacella | ................ | H04L 9/3239 |
| 2004/0128378 A1* | 7/2004 | Blakley, III | ............ | G06F 21/41 |
| | | | | 709/224 |
| 2005/0038721 A1* | 2/2005 | Goeckel | ................ | G06Q 40/02 |
| | | | | 705/30 |
| 2012/0204032 A1* | 8/2012 | Wilkins | ............. | H04L 63/0428 |
| | | | | 713/170 |
| 2013/0073521 A1* | 3/2013 | Ng | .......................... | G06F 16/25 |
| | | | | 707/610 |
| 2013/0204886 A1* | 8/2013 | Faith | ...................... | G06Q 30/06 |
| | | | | 707/756 |
| 2014/0114832 A1* | 4/2014 | Escott | ................... | G06Q 40/04 |
| | | | | 705/37 |

(Continued)

*Primary Examiner* — Ali Shayanfar (57) ABSTRACT

A network device receives a smart contract for permissions to access a service, wherein the smart contract is in an initial block for authorizations in a shared ledger. The network device receives, from an authorization server device, an update to the shared ledger, wherein the update is a proposed block in the shared ledger requiring validation. The network device stores, in a local memory, a copy of the shared ledger with the update, when the update is validated by the distributed consensus network. The network device receives, from a client device, an item request for an item associated with the service, wherein the item request includes a client identifier. The network device identifies if there is match of the client identifier and the item in the copy of the shared ledger and sends, to the client device, the item when there is match of the client identifier and the item.

20 Claims, 8 Drawing Sheets

(56) References Cited

U.S. PATENT DOCUMENTS

| | | | | |
|---|---|---|---|---|
| 2014/0172944 | A1* | 6/2014 | Newton | H04L 67/06 709/202 |
| 2014/0219167 | A1* | 8/2014 | Santhanam | H04W 28/0268 370/328 |
| 2014/0298413 | A1* | 10/2014 | Anderson | H04L 63/0807 726/3 |
| 2014/0372319 | A1* | 12/2014 | Wolovitz | G06Q 20/3829 705/71 |
| 2015/0228004 | A1* | 8/2015 | Bednarek | G06Q 10/08355 705/26.8 |
| 2018/0225466 | A1* | 8/2018 | Ducatel | G06Q 20/065 |
| 2018/0225469 | A1* | 8/2018 | Daniel | G06F 21/62 |
| 2018/0285839 | A1* | 10/2018 | Yang | G06Q 20/0655 |

* cited by examiner

PERMISSIONS USING BLOCKCHAIN

CROSS REFERENCE TO RELATED APPLICATION

This application is a continuation of U.S. patent application Ser. No. 15/442,235 filed on Feb. 24, 2017, the disclosure of which is hereby incorporated by reference.

BACKGROUND

Connected devices (which may include basically any device with connection to the Internet) have nearly limitless applications that can be leveraged to form new and useful services. These services for connected devices are distributed and managed by various control points that users can access in a variety of ways. The number of connected devices is projected to grow exponentially in the years ahead. For network service providers, support of connected devices involves providing network services at a low cost and supporting millions or even billions of devices. In many cases, authorization for each client interaction must be validated. In a distributed system with large scale, such authorizations can overburden the network.

DETAILED DESCRIPTION OF THE PREFERRED EMBODIMENTS

The following detailed description refers to the accompanying drawings. The same reference numbers in different drawings may identify the same or similar elements.

Implementations described herein provide a system and method for granting permissions in a distributed environment. In a distributed hyperscale system, the load on a server or set of servers introduces problems of scale and delay. For example, with potentially millions of clients validating authorization to a dozen or more distributed nodes and thousands of files for each service interaction, a server complex would need great scale. To reduce delay, the servers should be located close to the clients. However, if the clients are distributed across a wide geographical area, the cost of maintaining the right scale at the right sites becomes challenging. In addition, hardening (e.g., minimizing vulnerabilities, maximizing uptime, etc.) becomes a problem. True hitless authorization would require synchronizing the databases across all available nodes. If a request fails, the client would not know if the failure is on the distributed service node or the server.

Scale and delay concerns can be compounded in one example, when each distributed service node must validate authorization for each client interaction. In such a platform, the services would generate encrypted shards of the file and store the shards on dozens of primary and secondary service nodes per file. These service nodes would ideally operate in a semi-autonomous manner, with minimal oversight by a controller. A server would set permissions and interact with other servers in remote domains. A set of controllers would modify network settings; determine which shards are placed on which nodes, and add/remove nodes from the topology. The controllers can have separate functionally from the servers, but could be collocated in the same computing complex.

Implementations described herein provide distributed authentication using a blockchain database that invokes one or more smart contracts using, for example, a known programming language. Because the permissions change relatively infrequently, the rate of interaction needed from the authorization server into the blockchain database is low. Due to this condition, the blockchain (also referred to herein as a "shared ledger") can be used during bifurcation events or other server downtime situations, greatly reducing the need for server-side hardening and, therefore, simplifying server operations and improving server scalability.

According to one implementation, a node (e.g., a network device) in a distributed consensus network may receive a smart contract for permissions to access a service. The smart contract may be in an initial block for authorizations in a shared ledger. The node may receive, from an authorization server, an update to the shared ledger. The update may be a proposed block in the shared ledger requiring validation by the distributed consensus network. The node may store, in a local memory, a copy of the shared ledger with the update, when the distributed consensus network validates the update. The node may later receive, from a client device, an item request for an item associated with the service. The item request may include a client identifier. The node may determine if there is match of the client identifier and the item in the copy of the shared ledger and send the item to the client device when there is match of the client identifier and the item.

This server-less mode also is ideal for ad hoc or disaster scenarios where parts of the network are isolated. As long as the client device knows how far into the future the permissions state is assumed to be valid (such as monthly billing cycle), then the client device can assume that existing permissions are valid until that interval expires (i.e., first of the following month).

Figure 1:
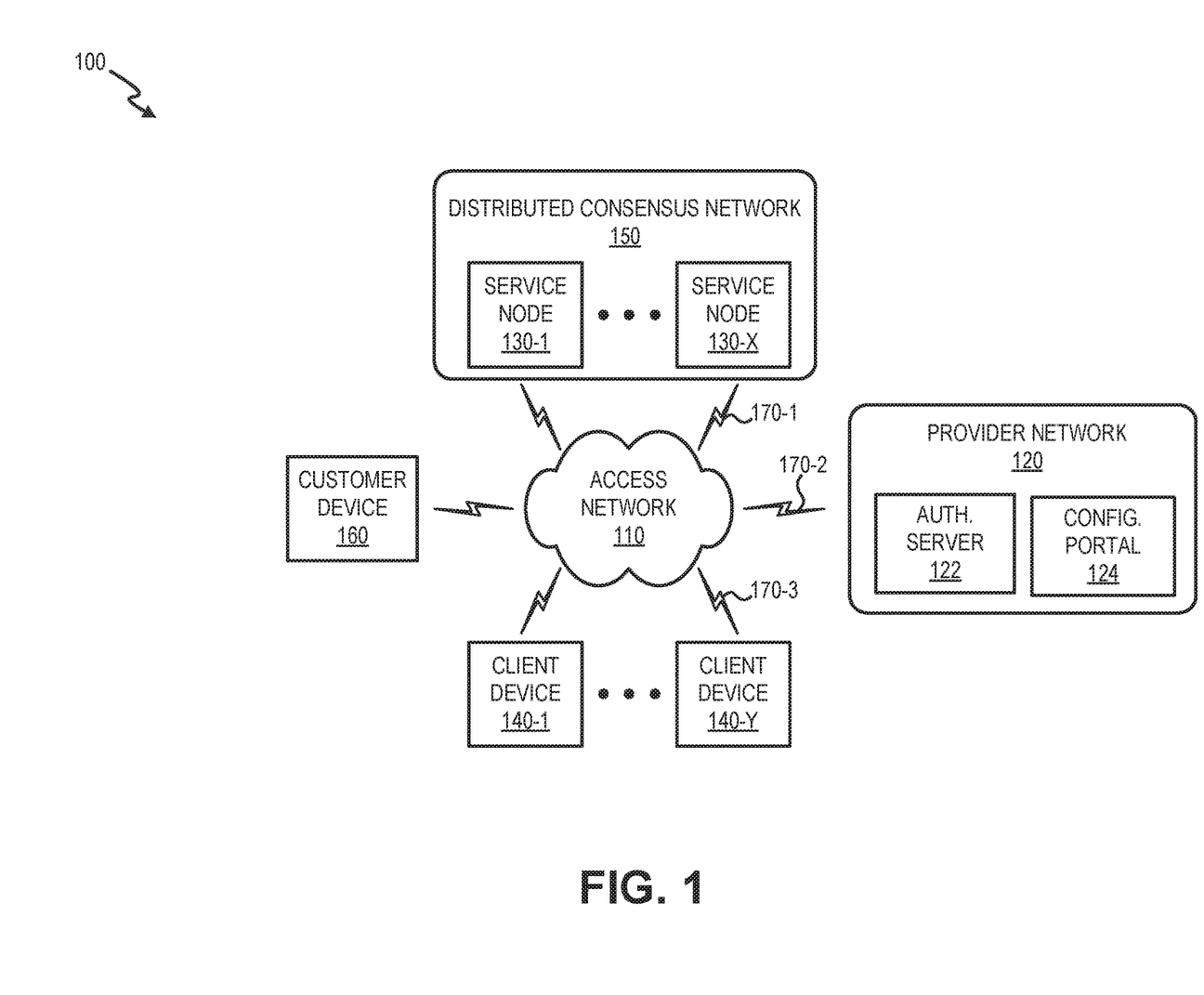
FIG. 1 is a diagram that depicts an exemplary network environment in which systems and methods described herein may be implemented.

FIG. 1 is a diagram illustrating an exemplary environment 100 in which systems and methods described herein may be implemented. As illustrated, environment 100 may include an access network 110, a provider network 120, service nodes 130-1 through 130-X (also referred to as collectively as "service nodes 130" and, individually or generically as "service node 130"), client devices 140-1 through 140-Y (also referred to as collectively as "client devices 140" and, individually or generically as "client device 140"), a distributed consensus network 150, and a customer device 160.

Access network 110, provider network 120, service nodes 130, client devices 140, distributed consensus network 150, and a customer device 160 may include one or more network elements or be combined within one or more network elements. Provider network 120, for example, may have multiple network elements including, but not limited to, an authorization server 122 and a configuration portal 124. A network element may be implemented according to a centralized computing architecture, a distributed computing architecture, or a cloud computing architecture (e.g., an elastic cloud, a private cloud, a public cloud, a virtual cloud etc.). Additionally, a network element may be implemented according to one or multiple network architectures (e.g., a client device, a server device, a peer device, a proxy device, and/or a cloud device).

As further illustrated, environment 100 includes communication links 170 between the network elements and networks (although only three are referenced in FIG. 1 as links 170-1, 170-2, and 170-3). A network element may transmit and receive data via a link 170. Environment 100 may be implemented to include wireless and/or wired (e.g., electrical, optical, etc.) links 170. A communication link between network elements may be direct or indirect. For example, an indirect communication link may involve an intermediary device or network element, and/or an intermediary network not illustrated in FIG. 1. Additionally, the number, the type (e.g., wired, wireless, etc.), and the arrangement of links 170 illustrated in environment 100 are exemplary.

Access network 110 may include one or multiple networks of one or multiple types. For example, access network 110 may include a terrestrial network, a satellite network, a wireless network, and/or a wired network. In some implementations, access network 110 may incorporate other networks, such as a core network or a backhaul network.

Provider network 120 includes one or multiple networks of one or multiple types. For example, service network 120 may include an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, provider network 120 includes authorization server 122 and configuration portal 124. According to other exemplary embodiments, authorization server 122, configuration portal 124, and/or a portion thereof may be combined in a single device or a distributed environment.

Authorization server 122 includes one or more network devices that manage permissions for users of client devices 140. For example, authorization server 122 may add/remove users for a service. Additionally, or alternatively, authorization server 122 may add/remove permissions to access items from a user's permissions set. The items can be discrete items or lists of items associated with the service. Authorization server 122 can have read/write capability for a distributed (e.g., shared) ledger of permissions. Other aspects of authorization server 122 are described further in connection with, for example, FIG. 3.

Configuration portal 124 includes one or more network devices that provide configuration management for services (e.g., services offered through provider network 120) that require permission for users to access. Customers of the services may manage (e.g., configure, issue commands, update, monitor, etc.) user profiles and other setting via, for example, customer device 160.

Service node 130 includes one or more network devices that provide storage and/or computing resources for a given service. In one implementation, for example, service node 130 may include a third-party-owned network device that is in a separate domain from provider network 120. In another implementation, service node 130 may be part of a content distribution network that is associated with provider network 120. According to an implementation described herein, each service node 130 may leverage the shared ledger (e.g., as generated by authorization server 122 and verified by consensus network 150) to provide authorization services for client devices 140. For example, service node 130 may include logic that allows for validating an API call from client device 140 before performing the function or operation of the API call.

Client device 140 may include a connected device or computing device operated by a user or on behalf of a user. Client device 140 may request items or services, which require permission, from one or more service nodes 130. In one implementation, client device 140 may send a request to service nodes 130 for an item. One or more locations (e.g., a service node address) from which to retrieve an item may be obtained, for example, as part of a service registration, an application download, or another process for client device 140. Client 140 may further include software to process items received from service nodes 130. For example, client 140 may play, decode, store, present, or otherwise handle data from service nodes 130.

Distributed consensus network 150 may include network devices that participate in validation of shared ledger entries. In one implementation, distributed consensus network 150 may include some or all of service nodes 130. In another implementation, distributed consensus network 150 may consist of nodes (not shown) other than service nodes 130. For example, multiple servers or proxy nodes running in cloud or edge compute clusters/farms can be leveraged as the consensus network to reduce a burden on service nodes 130.

Each participating node in distributed consensus network 150 maintains a continuously-growing list of records referred to herein as a "shared ledger," which is secured from tampering and revision. Any updates from authorization server 122 (or another trusted node) will be added into the shared ledger. Each version of the shared ledger contains a timestamp and a link to a previous version of the shared ledger. The authorization is added in chronological order to the shared ledger, and the shared ledger is presented to each of participating nodes in distributed consensus network 150 as a cryptographically secured block. Each entry of the shared ledger may be considered a node in a hash tree structure for efficiency. This hash tree ensures that blocks received from authorization server 122 (or another trusted node) are received undamaged and unaltered, and enables distributed consensus network 150 to check that the other nodes in distributed consensus network 150 do not have fraudulent or inaccurate blocks in the shared ledger.

Customer device 160 may include a communication and computational device. Customer device 160 may be implemented as a mobile device, a portable device, or a stationary device. For example, customer device 160 may be implemented as a smartphone, a tablet, a computer (e.g., a laptop, a desktop, a palmtop, etc.), a personal digital assistant, a terminal, and so forth. According to an exemplary embodiment, customer device 160 provides access to devices in provider network 120. For example, customer device 160 includes a client, such as a web browser or other suitable software application. In one implementation, customer device 160 may include a web browser or other user interface to exchange data with configuration portal 124. In another implementation, customer device 160 may be incorporated with client device 140.

Links 170 provide communication paths between network elements and/or networks of environment 100. Links 170 may have certain characteristics, such as bandwidth capacity, transmission data rate, and the like.

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be multiple authentication servers 122, configuration portals 124, and so forth. Additionally, or alternatively, according to other embodiments, multiple network elements may be implemented on a single device, and conversely, a network element may be implemented on multiple devices. In other embodiments, one network in environment 100 may be combined with another network.

Figure 2:
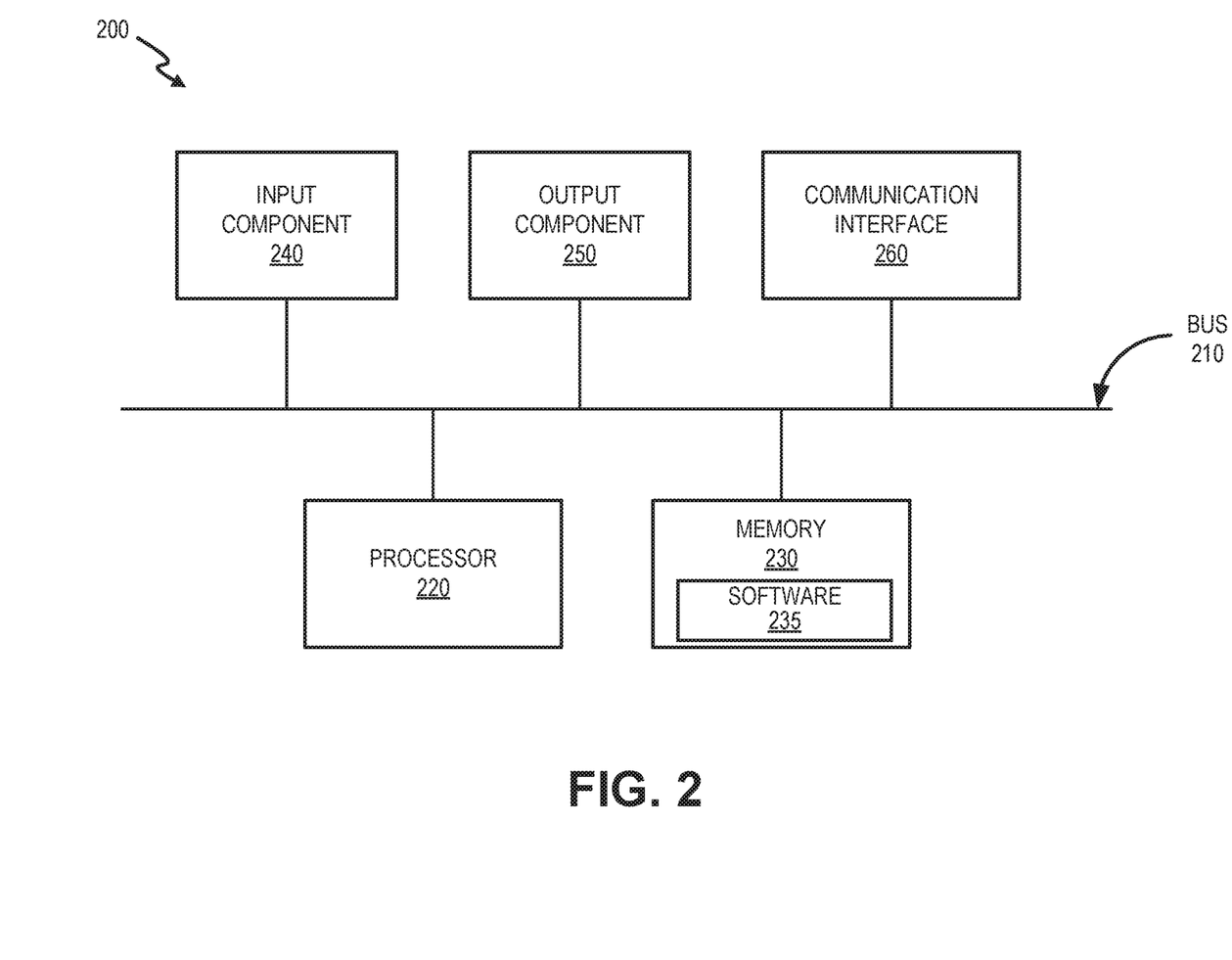
FIG. 2 is a diagram illustrating exemplary components of a device that may correspond to the network elements and an end device depicted in the environment of FIG. 1.

FIG. 2 is a diagram illustrating exemplary physical components of a device 200. Device 200 may correspond to each of the network elements, including authorization server 122, configuration portal 124, service nodes 130, client devices 140, and customer device 160 depicted in network environment 100. Device 200 may include a bus 210, a processor 220, a memory 230, an input component 240, an output component 250, and a communication interface 260.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Software 235 includes an application or a program that provides a function and/or a process. Software 235 is also intended to include firmware, middleware, microcode, hardware description language (HDL), and/or other form of instruction. By way of example, with respect to the network elements that include logic to provide blockchain entry authentication, these network elements may be implemented to include software 235. Additionally, for example, client device 140 may include software 235 (e.g., an application to communicate with service node 130, etc.) to perform tasks as described herein.

Input component 240 may include a mechanism that permits a person to input information to device 200, such as a keyboard, a keypad, a button, a switch, etc. Output component 250 may include a mechanism that outputs information to the person, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions (e.g., software 235) contained in a computer-readable medium, such as memory 230. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. As another example, device 200 may include one or more switch fabrics instead of, or in addition to, bus 210. Additionally, or alternatively, one or more components of device 200 may perform one or more tasks described as being performed by one or more other components of device 200.

Figure 3:
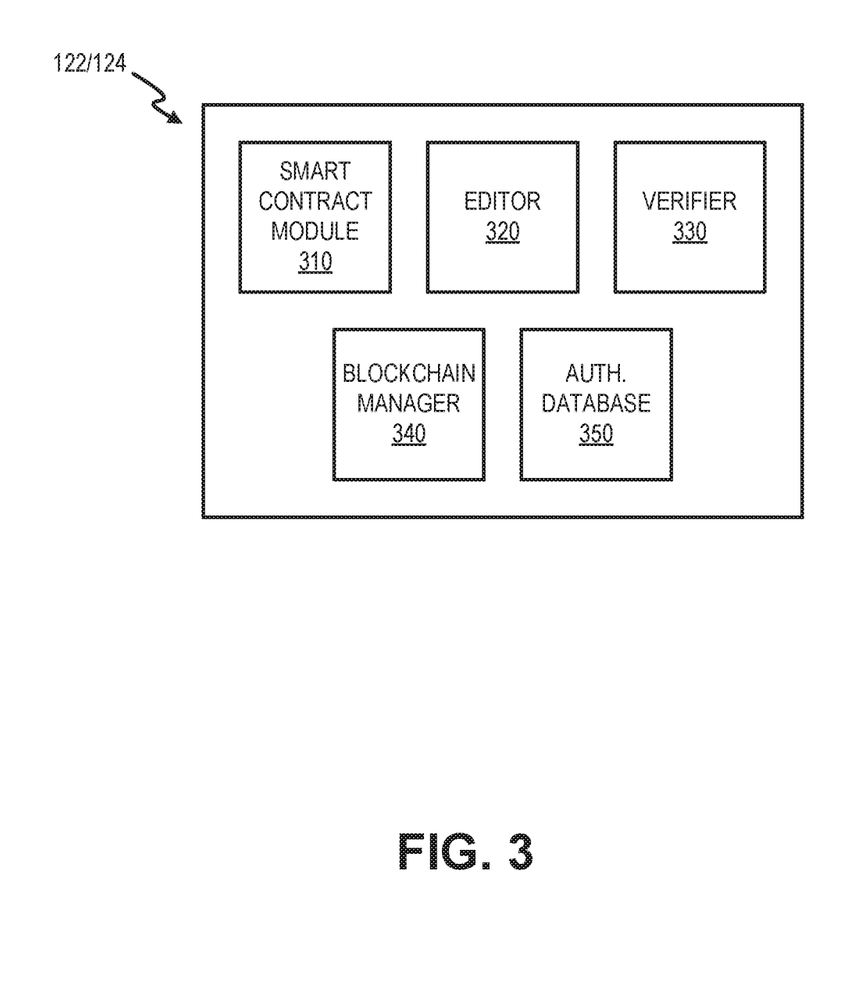
FIG. 3 is a diagram illustrating exemplary logical components of the authentication server of FIG. 1.

FIG. 3 is a diagram illustrating exemplary logical components of authorization server 122 and configuration portal 124. In one implementation, the functions described in connection with FIG. 3 may be performed by one or more components of authorization server 122 and configuration portal 124 (FIG. 2). Some or all of the logical blocks of FIG. 3 may be included, for example, in an application (e.g., software), stored in memory 230 and executed by processor 220. Logical components of authorization server 122 and configuration portal 124 may generally allow provider network 120 to manage a distributed ledger of permissions. As shown in FIG. 3, authorization server 122 and/or configuration portal 124 may include a smart contract module 310, an editor 320, a verifier 330, a blockchain manager 340, and an authorization database 350.

Smart contract module 310 stores and manages smart contracts for users of client devices 140. A smart contract may apply to one or multiple users. The smart contract has logic that allows the authorization server 122 to add or remove users. Authorization server 122 may also add or remove permissions and/or items from the user's permissions set. The items can be discrete items or lists of items. According to one implementation, the smart contract may include application binary interface (ABI) that may restrict particular nodes (e.g., service nodes 130) to read-only operations and permit read/write operations by only trusted nodes (e.g., authorization server 122). A smart contract does not require any user to be in the contract when it is created. That is, at the time of creation, a smart contract may have zero or more users.

Editor 320 may provide an interface (e.g., a text-based or graphical user interface) for creating smart contracts. Editor 320 may be implemented, for example as a software module that allows for creation of a smart contract (and a corresponding ABI) in human-readable input/output. In one implementation, editor 320 may provide structured input fields to identify, for example, users, classes, items, lists, permissions, permission templates, conditions, and/or memberships for a particular smart contract.

A "user" may indicate a user of the service. The user may generally be the operator of a client device (e.g., client device 140). The user's credentials identify the user uniquely for the service. A "class" may include a list of users that have the same credentials. The user can be associated with a class, granting of a set of permissions (or a permission template, as described below) to a list.

"Items" are physical or digital assets associated with the service that require authorization or associated permissions before being accessed by a user. A "list" is an association of items, where the name of a list can be used as a single reference to refer to the group of items. The list can also be maintained as entries in the shared ledger or can be communicated separately, depending on frequency of updates to the list.

"Permissions" are parameters associated with items or lists for a given user detailing the type of access allowed (read, read/write, add metadata, remove metadata, change metadata, update manifest tree, etc.). "Permission templates" are sets of permissions that can be copied into a class. If a class has the same permissions but possibly different conditions (described below), the permissions template can be used to reduce the amount of data entered into the shared ledger.

"Conditions" may indicate conditional parameters associated with permissions on a per-user or per-class basis. Conditions can include a time of day (restrict access to a certain time period, for example), a day of the week (restrict access to weekends, for example), or time duration from a given absolute or relative timestamp (hours/days/months, etc.), access frequency limits (e.g., one-time access, five times, etc.), aggregate time duration or view duration, or membership in a given sub-community.

In addition to a class, users may also be described as part of a sub-community "membership" within a class. Membership may grant variable permissions regarding content specific to that membership. In addition to a list, items may also be described as part of a sub-community membership, which grants variable permissions regarding users of that membership.

Verifier 330 may provide a test platform to verify smart contracts (e.g., new smart contracts or changed smart contracts). Verifier 330 may, for example, analyze logical consistencies of one or more smart contracts and test corresponding ABIs in production without using real assets (cost of work). In one implementation, verifier 330 may incorporate a test each time editor 320 indicates a new smart contract or smart contract update is complete.

Blockchain manager 340 may include logic to add users, classes, items, lists, permissions, permission templates, conditions, and/or memberships from each smart contract into the shared ledger (e.g., a blockchain). Blockchain manager 340 may compile the entire smart contract into binary code and may generate one or more parameters (e.g., received from editor 320) of the smart contract into one or more ABIs per smart contract. The ABI effectively can be used to interact with the smart contract from a given application. In one implementation, the compiled code may be in a binary or hexadecimal form that is inserted into the shared ledger. In one implementation, blockchain manager 340 may generate a receipt, such as a hexadecimal code, that validates the entry of a smart contract into the shared ledger prior to the contract being validated by the consensus network. Additionally, or alternatively, on insertion of a revised smart contract in the shared ledger, a new address is provided. The previous smart contract may be invalidated using the ABI associated with the previous smart contract parameters.

In one implementation, different ABI functions may be available to different nodes in network environment 100. For example, a "Read/Write Entry ABI" may be used to add, remove or modify specific entries in the shared ledger. Read/Write Entry ABIs may be limited, for example, to use by authorization server 122 or a designated trusted node. A "Node Read ABI" may be used to only read specific entries in the shared ledger. Node Read ABIs may be used, for example, by any of service nodes 130 to validate authorization for a requested item. A "Server Read ABI" may provide audit capabilities to fields in the shared ledger, including providing a tally or sum of the number of entries for a corresponding field.

Authorization database 350 may locally store the shared ledger (e.g., blockchain) of entries that are generated by blockchain manager 340. By virtue of this action, authorization server 122 becomes part of the distributed consensus network 150 and the shared ledger is validated by the distributed consensus network 150.

Figure 4:
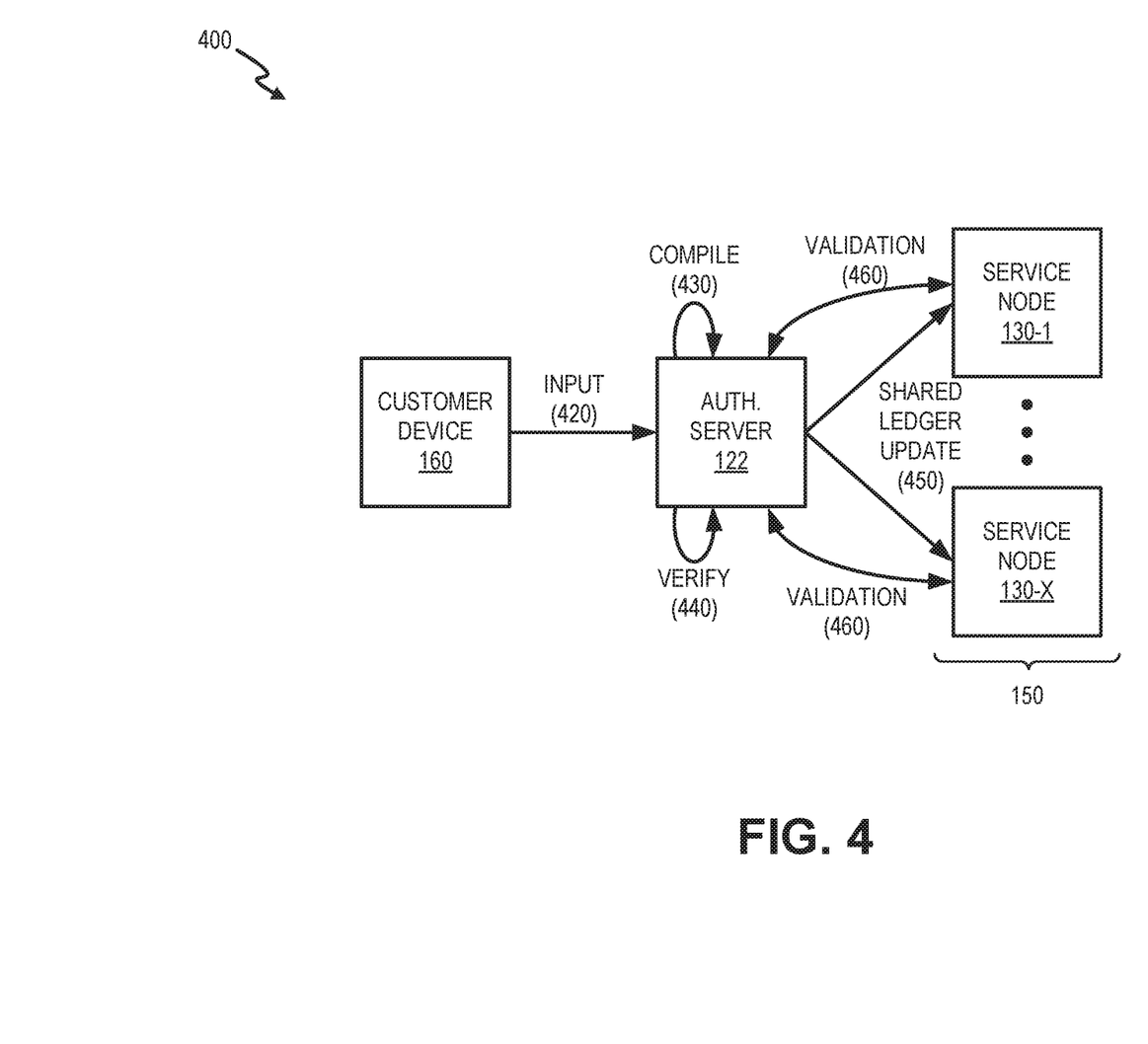
FIG. 4 is a diagram illustrating communications to establish a distributed ledger for permissions in a portion of the network environment of FIG. 1.

FIG. 4 is a diagram illustrating communications to establish a distributed ledger for permissions in a portion 400 of network environment 100. As shown in FIG. 4, network portion 400 may include authorization server 122, configuration portal 124, service nodes 130 within distributed consensus network 150, and customer device 160.

An administrator, for example, may provide input 420 for a smart contract, via customer device 160, to authorization server 122. Input 420 may specify users, classes, items, lists, permissions, permission templates, conditions, and/or memberships for a particular smart contract. Input 420 may be provided, for example, via editor 320 to allow structured input for a smart contract and subsequent conversion to ABIs.

Authorization server 122 may receive input 420. Authorization server 122 (e.g., blockchain manager 340) may convert input 420 into compiled code 430 (e.g., including ABIs). In one implementation, as shown in FIG. 4, authorization server 122 may verify 440 input 420 either before or after conversion to compiled code. For example, verifier 330 may test input 420 or the ABIs in a manner that does not trigger in distributed consensus network 150 the cost of work associated with verifying actual blockchain modifications.

Authorization server 122 may provide data from input 420 into a shared ledger update 450. Shared ledger update 450 may include, for example, actual changes to a smart contract along with a computed hash of the specification of the users, classes, items, lists, permissions, permission templates, conditions, and/or memberships from input 420 that can be verified by consensus of participating service nodes 130 in distributed consensus network 150. Shared ledger update 450 may be distributed to each of the participating service nodes 130 for validation.

Participating service nodes 130 are required to validate the updates into the shared ledger by using fields in shared ledger update 450 (i.e., the most recent block of the blockchain) and the last validated block in the chain to quickly compare against well-known mathematical functions. Each of participating service nodes 130 may perform calculations to confirm shared ledger update 450 and exchange validation results 460 with authorization server 122 and other nodes in distributed consensus network 150. Assuming validation of the update, an updated shared ledger (e.g., blockchain) for the particular service may be stored locally with authorization server 122 and service nodes 130.

Figure 5:
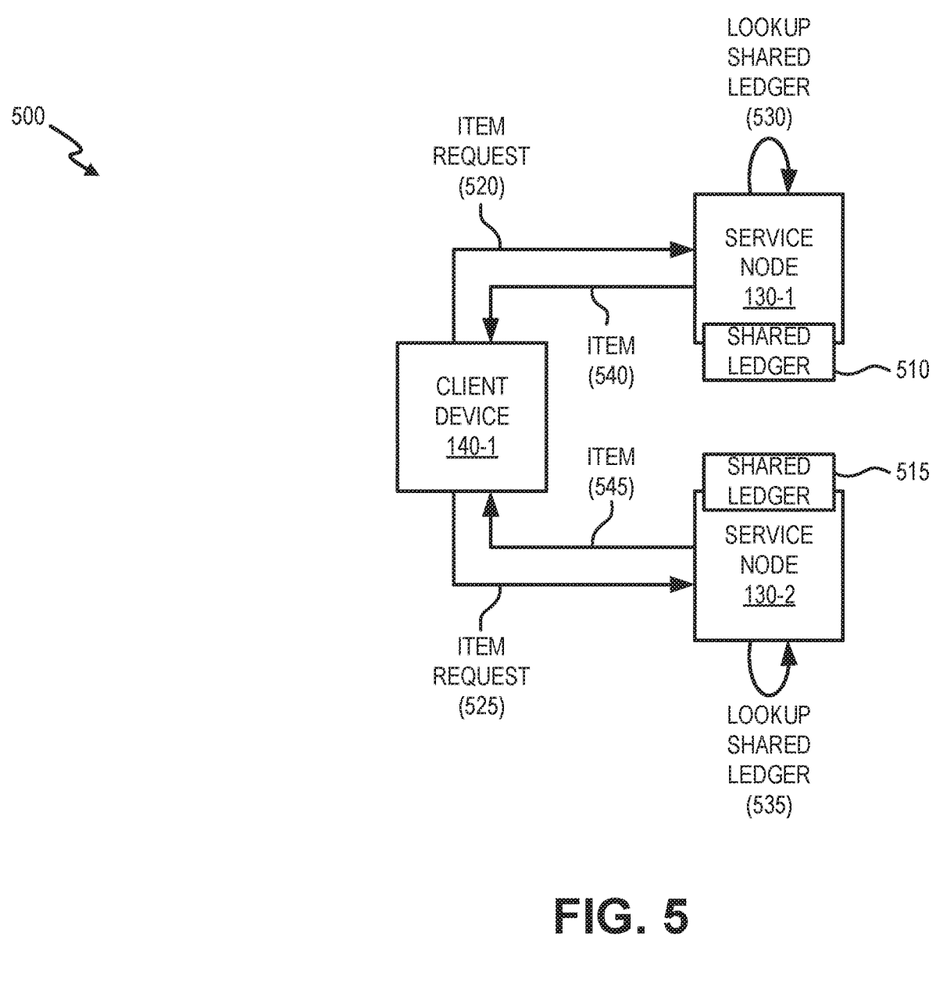
FIG. 5 is a diagram illustrating communications to use a distributed ledger for permissions in a portion of the network environment of FIG. 1.

FIG. 5 is a diagram illustrating communications to use a distributed ledger for permissions in a portion 500 of network environment 100. As shown in FIG. 5, network portion 500 may include service nodes 130-1 and 130-2 and client device 140-1.

Service node 130-1 may locally store a copy 510 of a shared ledger with permissions for a particular service (e.g., shared ledger 450 that was propagated to distributed consensus network 150 in FIG. 4), and service node 130-2 may locally store another copy 515 of the shared ledger. Because the permissions in the shared ledger do not change often, the rate of interaction needed from authorization server 122 (not shown in FIG. 5) into the shared ledger, and the subsequent distribution of ledger updates, is infrequent (compared to the frequency of permission requests from client devices 140).

At a point in time after service nodes 130 store shared ledger copies 510/515, client device 140-1 may provide an item request 520 to service node 130-1 and an item request 525 to service node 130-2. Item requests 520 and 525 may be directed, for example, to addresses for service nodes 130-1 and 130-2 based on instructions for an application to retrieve items in a distributed architecture. For example, item request 520 may request a chunk of a larger data set and item request 525 may request a different chunk of the data set. Item requests 520 and 525 may include, for example, an identifier and/or credentials that identify a user uniquely for a requested service.

Service node 130-1 may receive item request 520 and validate the request by performing a lookup 530 comparing the credentials in item request 510 to the locally-stored shared ledger 510 in service node 130-1. For example, service node 130-1 may use a read-only ABI in the locally-stored shared ledger to find a matching identifier for the requested item. Assuming client 140-1 is authorized, service node 130-1 may provide the requested item 540. Similarly, service node 130-2 may receive item request 525 and validate the request by performing a lookup 535 comparing the credentials in item request 525 to the locally-stored shared ledger in service node 130-2. For example, service node 130-1 may use a read-only ABI in the locally-stored shared ledger to find a matching identifier for the requested item. Assuming client 140-1 is authorized, service node 130-2 may provide the requested item 545. Thus, permission for each request to service nodes 130 may be granted by service nodes 130 using locally stored shared ledgers and without requiring additional permission transactions or token transactions from authorization server 122.

Figure 6:
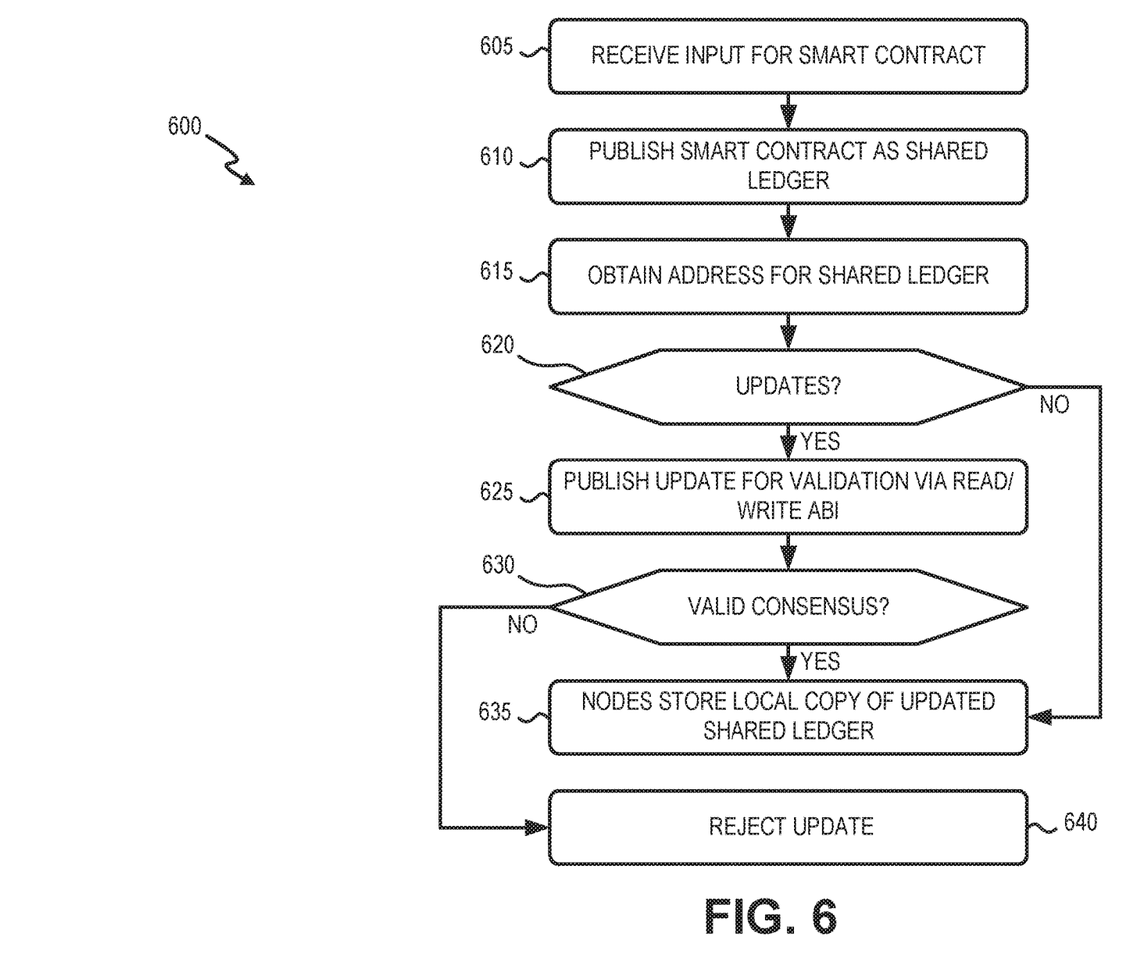
FIG. 6 is a flow diagram illustrating an exemplary process for establishing a shared ledger in a distributed services environment.

FIG. 6 is a flow diagram illustrating an exemplary process 600 for establishing a shared ledger in a distributed services environment. In one implementation, process 600 may be implemented by authorization server 122. In another implementation, process 600 may be implemented by authorization server 122 in conjunction with one or more other devices in network environment 100.

Process 600 may include receiving administrator input for a smart contract (block 605), publishing the smart contract in a shared ledger (block 610), and obtaining an address for the shared ledger (block 615). For example, an administrator or network technician may use editor 320 to provide a smart contract including permission settings for a service. Authorization server 122 may convert the administrator input into compiled code that can be published in an initial block for authorizations in a shared ledger. Authorization server 122 may generate an address for the shared ledger and publish the initial block with the smart contract to nodes 130 in distributed consensus network 150.

Process 600 may further include determining if there are any updates to the shared ledger (block 620). For example, an administrator or network technician may again use editor 320 to update the smart contract with, for example, new users or items.

If there are updates for the shared ledger (block 620—YES), process 600 may include publishing an update for validation via a read/write ABI (block 625), and determining if there is a valid consensus for the update (block 630). For example, authorization server 122 may convert the administrator input into compiled code that can be published as an update block for the shared ledger. Authorization server 122 may publish the update block to nodes 130 in distributed consensus network 150 for validation using proof of work (e.g., a piece of data that requires significant computation to find).

If there is no valid consensus for the update (block 630—NO), process 600 may include rejecting the update from the shared ledger (block 640). For example, if a majority of participating service nodes 130 in distributed consensus network 150 does not calculate matching proof of work results, the updated block will not be included in the shared ledger.

If there is a valid consensus for the update (block 630—YES) or if there are no updates for the shared ledger (block 620—NO), process 600 may include storing the updated shared ledger locally at service nodes for the distributed service (block 635). For example, if a majority of participating service nodes 130 in distributed consensus network 150 calculates matching proof of work results, or if the shared ledger includes the original smart contract block, each service node 130 may locally store a copy of the shared ledger.

Figure 7:
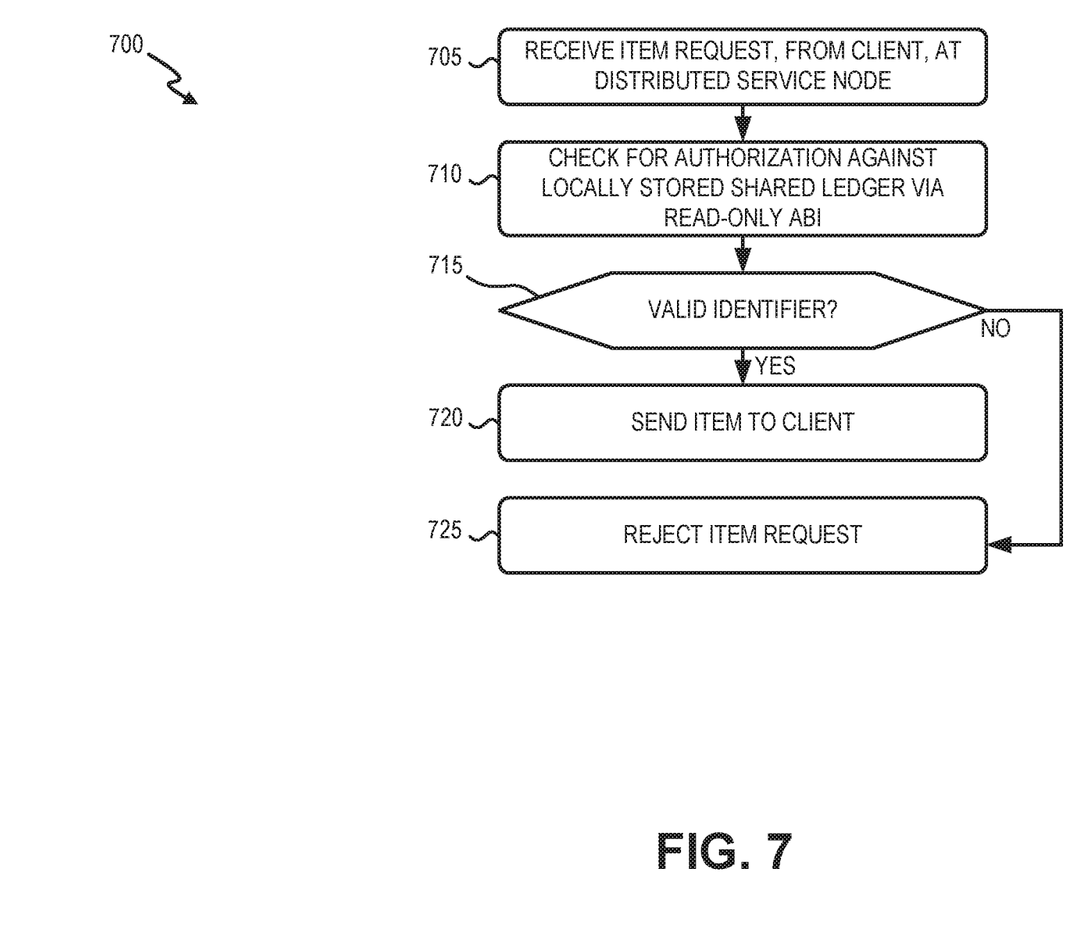
FIG. 7 is a flow diagram illustrating an exemplary process for performing distributed authentication.

FIG. 7 is a flow diagram illustrating an exemplary process 700 for using a blockchain shared ledger for permissions in a distributed services environment. In one implementation, process 700 may be implemented by a service node 130, such as a service node 130 that has received a shared ledger in process 600. In another implementation, process 700 may be implemented by a service node 130 in conjunction with one or more other devices in network environment 100.

Process 700 may include receiving an item request, from a client, at a distributed service node (block 705). For example client 140 may obtain an address (e.g., an IP address, URL, etc.) for one or service nodes 130. In one implementation, the node addresses may be provided from authorization server 122. In other implementations, the node addresses may be included with an application or API associated with the service. Using the node address, client 140 may provide an item request that includes a user identifier or similar credentials. Service node 130 may receive the item request.

Process 700 may also include checking for authorization against a locally stored copy of the shared ledger via a read-only ABI (block 710). For example, service node 130 may perform a lookup comparing the credentials in the item request to the locally-stored shared ledger in service node 130. Service node 130 may verify the authorization credentials for a given user identifier and item pair indicated in the item request. Service node 130 may also verify authorization based on other parameters, if they are present, such as permissions and conditions described above in connection with FIG. 3.

If there is a valid client identifier for the item request (block 715—YES), the requested item is sent to the client (block 720). For example, if the client device 140 has required permissions, service node 130 may provide the requested item, such as a content chunk, data, a file, etc.

If there is not a valid client identifier for the item request (block 715—NO), the item request is rejected (block 725). For example, if no matching identifier is found for the given user identifier and item pair in the item request, service node 130 may reject the item request from client device 140. Thus, for either an accepted or rejected item request from client 140, service node 130 may respond to the item request without generating a separate authorization inquiry to authorization server 122.

Figure 8:
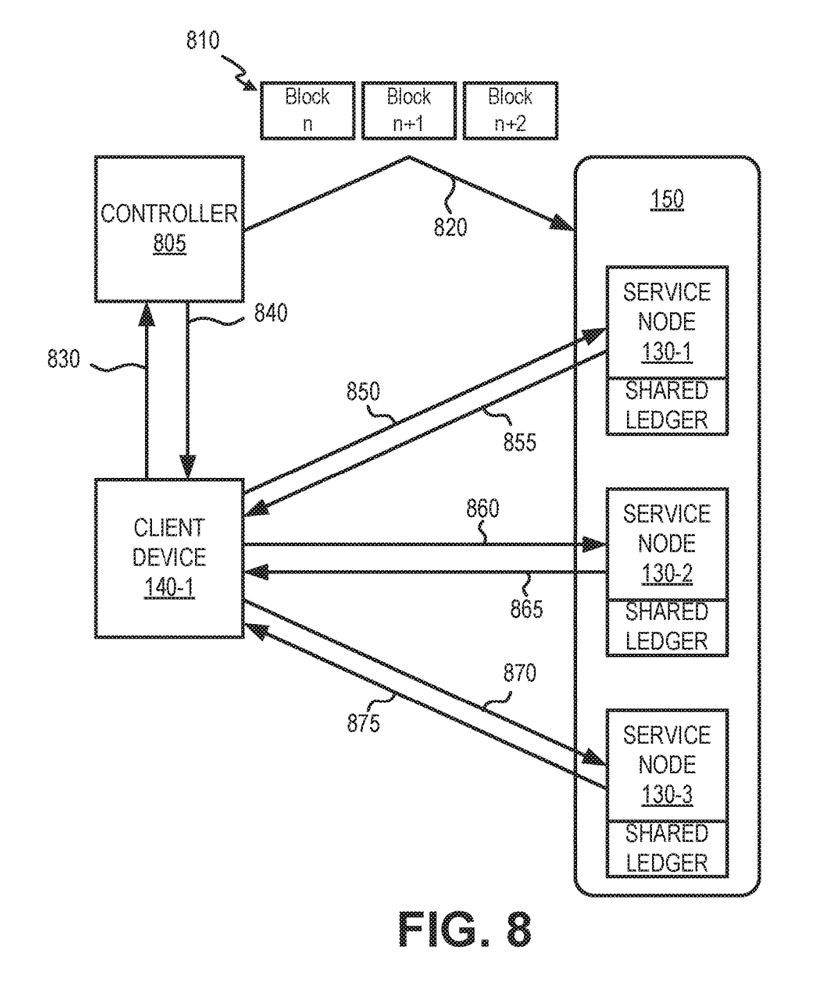
FIG. 8 is a diagram illustrating a use cases for authentications using a distributed ledger according to an implementation described herein.

FIG. 8 provides an illustration of a use cases for authorizations using a distributed ledger according to an implementation. In the example of FIG. 8, a content delivery system may provide portions of content from different service nodes. A controller 805 performs content management functions and incorporates authorization features of authorization server 122.

As shown in FIG. 8, an authorization contract (i.e., a smart contract within a shared ledger) may be published 820 to a blockchain group that includes controller 805 and service nodes 130. Controller 805 may be provided an address for the smart contract and may publish subsequent updates 810 to add subscribers (e.g., users) and content items to the smart contract. The updated data associated with the smart contract may be validated and copies (e.g., shared ledgers) stored locally at each service node 130 after each update.

A client device 140-1 may send a content request 830 to controller 805. Controller 805 and client device 140-1 may perform an authentication process for the requested content. Assuming client device 140-1 is authenticated and authorized, controller 805 may provide locations 840 (e.g., addresses of service nodes 130-1 through 130-3) to client device 140-1 from which portions of the requested content can be obtained. Using locations 840, client device 140-1 may request content chunks from each of service nodes 130-1, 130-2, and 130-3, as indicated by requests 850, 860, and 870. Each request may include a user identifier and the content identifier.

Each of service nodes 130-1 through 130-3 may receive the respective request. Using the locally stored shared ledgers, each service node 130 may individually compare the user identifier and content identifier pair against permissions in the shared ledger. Assuming valid authorizations, each of service nodes 130-1 through 130-3 may provide a different content chunk (for the requested content item) to client device 140-1, as indicated by responses 855, 865, and 875. Client device 140-1 may receive the respective chunks and assemble them locally for presentation to a user.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 6 and 7, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device in a distributed network, a first set of permissions with parameters to access a service, wherein the first set of permissions is in a first block of a shared ledger;
   receiving, by the network device and from an authorization service device, an update to the shared ledger, wherein the update is in a second block of the shared ledger, the second block comprising a second set of permissions with conditions for the parameters;
   storing, by the network device and in a local memory, the second block as part of an updated shared ledger, when the second block is validated by the distributed network;
   receiving, by the network device and from a client device, a request to access the service, wherein the request includes client identification; and
   providing access to the service, by the network device and to the client device, when there is a match of the client identification and the service in the request with the parameters and conditions in the updated shared ledger.

2. The method of claim 1, wherein the shared ledger includes a read-only application binary interface (ABI) for use by the authorization service device to audit fields in the shared ledger.

3. The method of claim 1, further comprising:
   receiving human-readable input to define the first set of permissions; and
   converting the human-readable input to code.

4. The method of claim 1, further comprising:
converting the second set of permissions from human-readable input to code.

5. The method of claim 1, wherein the update includes information specifying one or more of a new item for the service, a new user for the service, or a new permission parameter for an item.

6. The method of claim 1, wherein the shared ledger identifies items and users that have permission to access the items.

7. The method of claim 1, wherein the shared ledger includes a read-only application binary interface (ABI) for use by the network device.

8. The method of claim 1, further comprising:
providing, to the client device, an address for a service node from which the service can be obtained.

9. The method of claim 1, wherein the network device and the authorization service device are computing devices within different private domains.

10. One or more network devices in a distributed network, comprising:
one or more memory devices for storing instructions; and
one or more processors configured to execute the instructions to:
receive a first set of permissions with parameters to access a service, wherein the first set of permissions is in a first block of a shared ledger,
receive, from an authorization service device, an update to the shared ledger, wherein the update is in a second block of the shared ledger, the second block comprising a second set of permissions with conditions for the parameters,
store, in a local memory, the second block as part of an updated shared ledger, when the second block is validated by the distributed network,
receive, from a client device, a request to access the service, wherein the request includes client identification, and
provide, to the client device, access to the service when there is a match of the client identification and the service in the request with the parameters and conditions in the updated shared ledger.

11. The one or more network devices of claim 10, wherein the shared ledger includes a read-only application binary interface (ABI) for use by the authorization service device to audit fields in the shared ledger.

12. The one or more network devices of claim 10, wherein the authorization service device is within a different private domain than the one or more network devices.

13. The one or more network devices of claim 10, wherein the one or more processors are further configured to execute the instructions to:
receive human-readable input to define the first set of permissions; and
convert the human-readable input to binary or hexadecimal code.

14. The one or more network devices of claim 10, wherein the one or more processors are further configured to execute the instructions to:
convert the second set of permissions from human-readable input to compiled code.

15. The one or more network devices of claim 10, wherein the update includes information specifying a new user for the service or a new permission parameter for an item.

16. The one or more network devices of claim 10, wherein shared ledger identifies users that have permission to access the service.

17. The one or more network devices of claim 10, wherein the one or more processors are further configured to execute the instructions to:
provide, to the client device, a content chunk for a requested content item.

18. A non-transitory computer-readable medium containing instructions executable by at least one processor, the computer-readable medium comprising one or more instructions to:
receive a first set of permissions with parameters to access a service, wherein the first set of permissions is in a first block of a shared ledger;
receive, from an authorization service device, an update to the shared ledger, wherein the update is in a second block of the shared ledger, the second block containing a second set of permissions with conditions for the parameters;
store, in a local memory, the second block as part of an updated shared ledger, when the second block is validated by a distributed network;
receive, from a client device, a request to access the service, wherein the request includes client identification; and
provide, to the client device, access to the service when there is a match of the client identification and the service in the request with the parameters and conditions in the updated shared ledger.

19. The non-transitory computer-readable medium of claim 18, wherein the shared ledger includes a read-only application binary interface (ABI).

20. The non-transitory computer-readable medium of claim 18, wherein the shared ledger includes a read-write application binary interface (ABI) for use by the authorization service device to update the shared ledger.

* * * * *